Feb. 9, 1971  H. W. BLETZ ET AL  3,562,692

THERMOSTAT ASSEMBLY

Filed May 22, 1969  2 Sheets-Sheet 1

INVENTORS
HOWARD W. BLETZ
& DONALD J. SCHMITT
BY
McNENNY, FARRINGTON, PEARNE & GORDON

ATTORNEYS

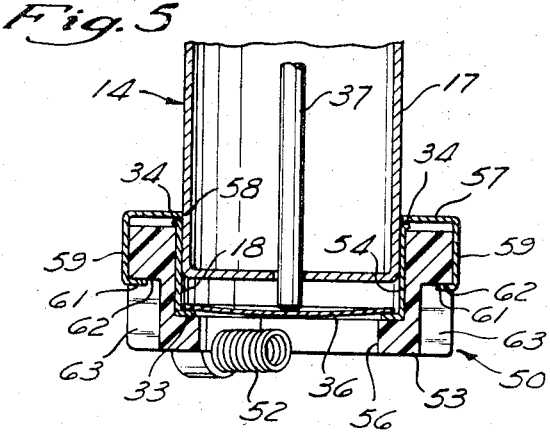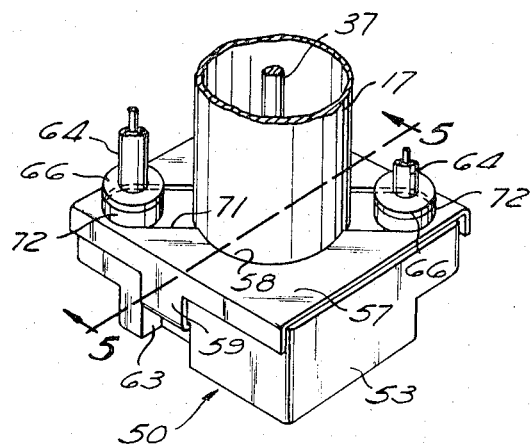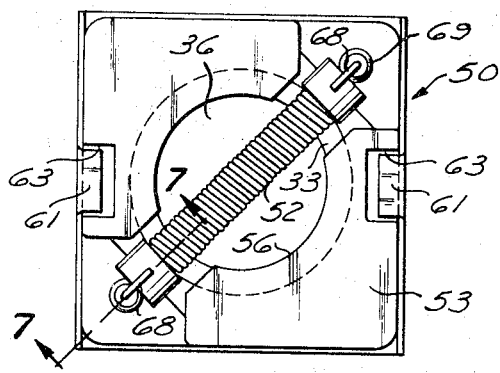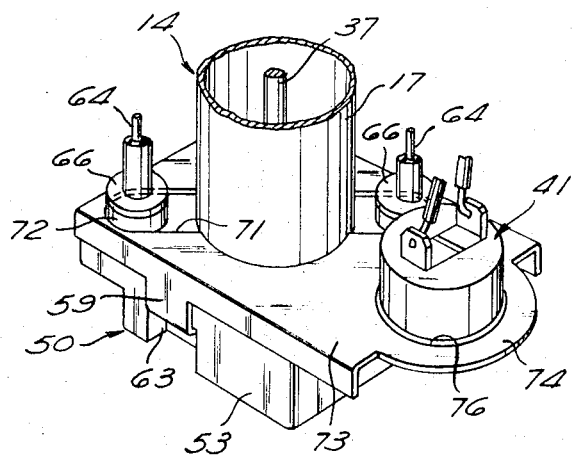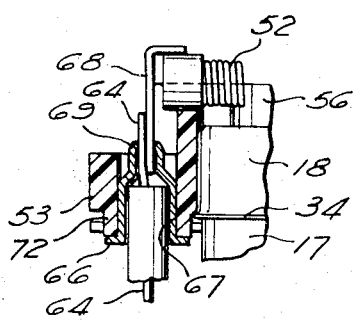

3,562,692
THERMOSTAT ASSEMBLY
Howard W. Bletz and Donald J. Schmitt, Mansfield, Ohio, assignors to Therm-O-Disc, Incorporated, Mansfield, Ohio, a corporation of Ohio
Filed May 22, 1969, Ser. No. 826,937
Int. Cl. H01h 37/04, 37/34, 37/54
U.S. Cl. 337—354                               18 Claims

ABSTRACT OF THE DISCLOSURE

A bi-metallic snap disc operated thermostat wherein the disc is mounted by means of a tubular extension at a location remote from the switch body assembly. The tubular extension is formed by one or more substantially similar tubular members having an apertured end wall at one end. The disc retainer cap is mounted on the end wall end of the adjacent tubular member and an elongated operating rod extends along the tubular extension through the apertured end wall from the disc to the switch body. The thermostat may be assembled in combination with a second high-limit thermostat, an anticipator heater, or both without modifying the tubular extension structure.

BACKGROUND OF INVENTION

This invention relates generally to thermostat structures and more particularly to a novel and improved bi-metallic snap disc operated thermostat incorporating an extension support assembly for positioning the snap disc at a location remote from the thermostat switch body assembly.

In a number of installations it is desirable to provide a thermostat structurally arranged so that a temperature sensing element of the thermostat is located on an extension and in a position remote from the switch body. For example, a fan control thermostat used in a typical forced hot air furnace is usually mounted on the side of the plenum in an externally accessible location. In such thermostats it is desirable however, to locate the temperature sensing element in a position inwardly from the plenum wall so that accurate temperature response can be obtained. An example of a typical prior art fan control thermostat is illustrated in the United States Letters Patent to Them, No. 2,879,357.

Also, in such thermostats, it is often desirable to combine in a single unit with the fan control thermostat, a second and separate thermostat which operates as a high-limit control to prevent hazardous conditions from occurring. Similarly, it is often desirable to provide an electrical resistance heater adjacent to the temperature responsive element of the fan control thermostat to operate as an anticipator to provide desired operating characteristics.

SUMMARY OF INVENTION

A thermostat incorporating the present invention provides a low cost, support extension for positioning the bi-metallic snap disc operator of a thermostat at a position remote from the switch body assembly. In the illustrated embodiment of this invention the extension support is an elongated tubular structure provided with a mounting flange at one end which is secured to the switch body assembly and a centrally apertured end wall at the other end. A cup-shaped disc cap is mounted on the end of the tubular extension and supports a bi-metallic snap disc at a position adjacent to, but spaced from, the apertured end wall. An operating rod assembly extends between the bi-metallic snap disc and the mobile switch contact located within the switch body assembly and moves the switch in response to disc movement. The rod assembly extends through the apertured end wall of the tubular extension and is laterally supported thereby adjacent to the disc to insure proper relative positioning of the disc and operating rod. In the illustrated embodiment, the tubular extension is formed of metal which has been drawn to the required shape.

In accordance with one aspect of this invention, the tubular extension can be formed of two substantially similar tubular members, each of which is formed with an apertured end wall at one end and an enlarged cylindrical portion at the other end. The two tubular members are proportioned so that the enlarged cylindrical portion of one member telescopes over the end wall end of the other member. The two members may be formed as a press fit, may be soldered to provide a permanent connection, or may be connected in any other suitable manner. In this embodiment, the operating rod extends through both apertured end walls so that lateral support is provided for the rod at the end adjacent to the disc and also at a mid-point along the rod.

In accordance with another aspect of this invention, a simple structure is provided for mounting a second thermostat such as a high-limit control thermostat adjacent to the end of the tubular extension. In accordance with still another aspect of this invention, an anticipator type heater is positioned adjacent to the disc of the thermostat by a simplified mounting structure. In accordance with still another aspect of this invention, a combined mounting structure is provided for mounting both a high-limit control and an anticipator heater on the end of the tubular extension.

DESCRIPTION OF FIGURES

FIG. 4 is an enlarged fragmentary perspective view of an embodiment of this invention wherein an electrical resistance heater is mounted on the tubular extension adjacent to the bi-metallic snap disc.

FIG. 5 is a fragmentary cross-section of the structure illustrated in FIG. 4;

FIG. 6 is an end view of the heater structure illustrated in FIGS. 4 and 5;

FIG. 7 is a fragmentary section taken along 7—7 of, FIG. 6 illustrating the lead wire heater wire connection; and FIG. 8 is a fragmentary perspective view of an embodiment wherein both an anticipator heater and a second thermostat are mounted on the end of the tubular extension.

Referring to FIG. 1, the thermostat includes a switch body assembly 10 secured to a mounting plate 11. Located in the switch body assembly 10 is a switch including a movable contact 12 which is movable into and out of engagement with a fixed contact. In this particular thermostat an adjusting spring 13 is provided to adjustably control the operating temperature of the thermostat. Since the particular switch structure and adjustment means is not specifically part of this invention, it has not been illustrated in detail. However, reference can be made to the pending application, Ser. No. 779,680, filed Nov. 29, 1968 for a detailed description of the switch mechanism and adjustment mechanism. It should be understood, however, that other switch mechanisms may be utilized in a thermostat incorporating this invention.

Figure 1:
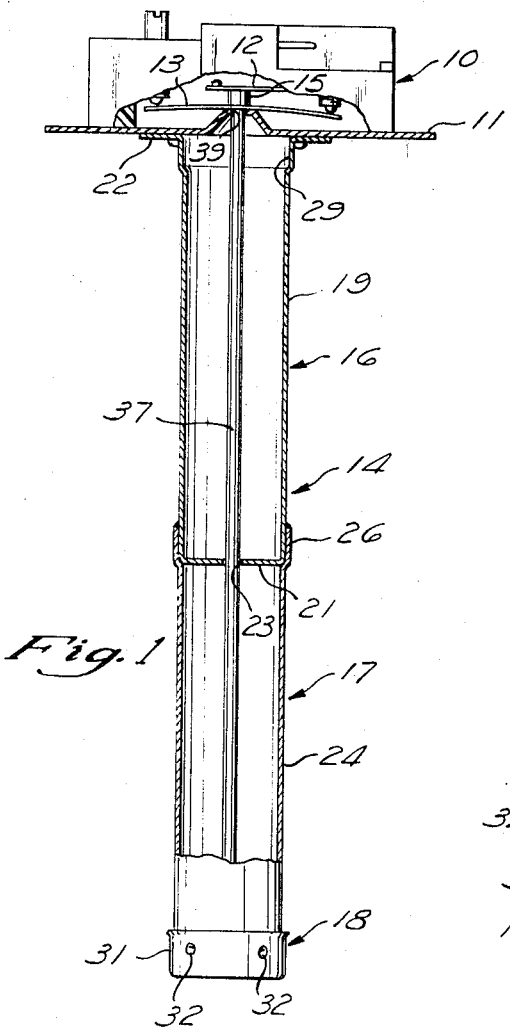
FIG. 1 is a side elevation partially in section illustrating a thermostat in accordance with this invention with one preferred form of tubular extension for positioning the snap disc operator at a location remote from the switch body assembly.

Mounted on the side of the mounting plate remote from the switch body assembly 10 is a support assembly 14 which includes a first tubular member 16, a second tubular member 17, and a disc retainer cap 18. The support members 16 and 17 and the cap 18 are preferably formed of metal by drawing, but may be formed of other materials and in other manners if desired. The member 16 includes a main cylindrical portion 19 having an end wall 21 at one end and a radial flange 22 at the other end. The end wall 21 is formed with a centrally located opening 23.

Figure 2:
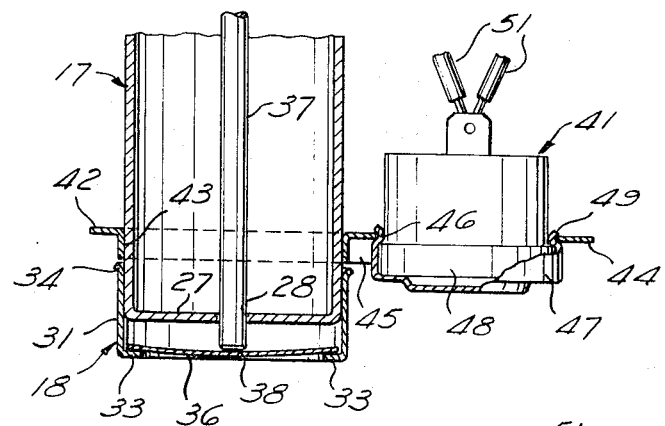
FIG. 2 is an enlarged fragmentary section illustrating the structural detail of the support for the bi-metallic snap disc and also illustarting a second thermostat mounted adjacent to the free end of the tubular extension.

The second member 17 in the illustrated embodiment is formed with a main cylindrical portion 24 having a diameter equal to the diameter of the cylindrical portion 19 of the member 16 and an enlarged cylindrical portion 26 at one end. The enlarged cylindrical portion 26 is sized to telescope over the adjacent end of the tubular member 16 with a close fit. The two members may be permanently connected by soldering or brazing, may be formed with a press fit, or may be otherwise permanently connected. The opposite end of the tubular member 17 is also provided with an end wall 27 (as illustrated in FIG. 2). Here again, the end wall 27 is formed with a centrally located opening 28. Preferably, the two tubular members 16 and 17 are identical in size and shape excepting for the flange 22 formed on the member 16. When such an arrangement is utilized, a single drawing die assembly may be used to manufacture both of the tubular members 16 and 17 and is merely necessary to shear off the flange to complete the manufacture of the tubular member 17. It is for this reason that the tubular member 16 illustrated in FIG. 1 is formed with an enlarged cylindrical portion 29.

Mounted on the lower end of the tubular member 17 is the disc cap 18. As best illustrated in FIG. 2, the disc cap 18 has a cylindrical side wall 31 which fits over the end of the member 17 and is permanently connected thereto by any suitable means such as staking at 32. The illustrated cap 31 is formed with an inwardly extending flange 33 and is flared slightly at its open end 34. In the event that it is desired to fully enclose the snap disc, the cap 31 may be provided with an imperforate end wall instead of the flange 33.

A bi-metallic snap disc 36 is positioned within the cap 31 against the flange 33. Preferably, the elements are arranged so that the snap disc is spaced from the end wall 27 to insure that it is free to snap between its two positions of stability. An operating rod 37 extends along the tubular extension 14 through the two openings 23 and 28 and engages the snap disc 36 at one end 38. The other end of the operating rod 37 extends through a guide opening 39 formed in the mounting plate 11 and through the spring 13 for operation of the mobile contact 12. An insulator element 15 may be used to electrically insulate the switch. The spring 13 transmits a biasing force to the operating rod 37 urging it in the direction of the disc 36 so that the disc is held against the flange 33. When the disc snaps between one position of stability and the other position of stability, it moves the rod 37, and in turn, moves the mobile contact to operate the thermostatic switch.

It should be understood that the use of two extension members 16 and 17 is not required in all instances. When the tubular member 16 provides sufficient extension length, the cap 18 is mounted directly on the end of the tubular member 16. In such a thermostat, the disc is positioned adjacent to the end of the tubular member 16. In such an arrangement, of course, the length of the operating rod 37 must be changed in a corresponding manner.

In some instances, it is desirable to provide a second thermostat 41 adjacent to the end of the tubular extension. Such a thermostat is often used as a high-limit control in a furnace system and is usually calibrated so that it does not operate during normal operation of a furnace system. It operates when excessive temperatures are reached to prevent hazardous conditions. The illustrated thermostat 41 may be of the type illustrated in the U.S. Letters Patent No. 3,014,105.

Figure 3:
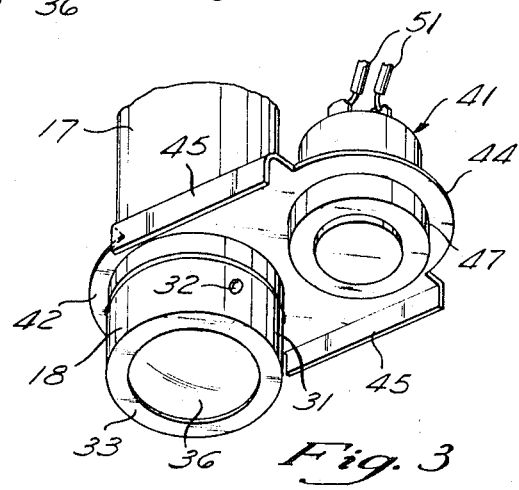
FIG. 3 is a perspective view of the embodiment illustrated in FIG. 2.

The thermostat 41 is supported, in the embodiment of FIGS. 2 and 3, by a mounting plate 42. The mounting plate 42 is formed with a flanged opening 43 proportioned to fit over the cylindrical portion 24 of the member 17 with an interference fit and is provided with a lateral extension 44 on which the thermostat 41 is mounted. Stiffening flanges 45 are provided. The lateral extension 44 is provided with an opening 46 through which the thermostat 41 extends. In the illustrated embodiment, the thermostat 41 is provided with a disc cap 47 which extends over an enlarged portion 48 on the thermostat body and is deformed inwardly adjacent to the plate 42. The disc cap extends through the opening 46 with a reduced diameter and is flared at 49 to secure the thermostat 41 in position. With this structure, the disc cap 47 provides radially extending surfaces on both sides of the plate 42 to mount the thermostat on the plate. Lead wires 51 connect the thermostat 41 to the external circuit.

Another embodiment is illustrated in FIGS. 4 through 7. In this embodiment a heater assembly 50 is mounted adjacent to the bi-metallic snap disc 36 and a high-limit thermostat is not provided. The structure of the tubular extension and the cap 18 is identical with the structure discussed above and it is not necessary to modify the main structure in order to mount the heater assembly 50. The heater assembly 50 includes a heater 52 diagonally mounted on a generally square heater housing 53. The heater housing is preferably molded of an insulating material such as phenolic resin.

The housing 53 is formed with a cylindrical recess 54 and a radially extending shoulder 56 proportioned to closely fit around the cap 18. The heater housing 53 is secured in position by a mounting plate 57 formed with an opening 58 sufficiently large to fit over the adjacent end of the tubular member 17 with a loose fit, but sized small enough to engage and bear against the flared edge 34 of the cap 18. Tabs 59 extend down along the heater housing 53 and are bent in at 61 to engage a surface 62 provided by the associated recesses 63 molded into the housing 53. The mounting plate 57 therefore is pressed against the edge 34 and causes the flange 56 to press against the flange 33 on the cap 18 to securely position the housing with respect to the cap 18.

Lead wires 64 are connected to the heater 52. The structure for such connection is best illustrated in FIG. 7. Each of the lead wires 64 extends into a grommet 66 positioned in an opening 67 molded in the housing 53. The grommets are formed of metal and are sized to also receive an associated heater connection wire 68. The grommet is crimped in at 69 against both the lead wire 64 and the heater wire 68 to provide a mechanical connection therebetween. Solder is also applied to insure a good electrical connection. The mounting plate is provided with a diagonal opening 71 (as best illustrated in FIG. 4) extending from the opening 58 in both directions to receive extensions 72 through which the grommets 66 extend. The extension 72 insures that the mounting plate 57 does not short the heater.

FIG. 8 discloses still another embodiment wherein a heater assembly 50 and a high-limit thermostat 41 are both mounted on the extension 14. The structure of the heater and the heater housing 53 in this embodiment is identical with the structure of the embodiment of FIGS. 4 through 7. In the embodiment of FIG. 8 a mounting plate 73 is provided which is similar in structure to the mounting plate 57 but is formed with a lateral extension 74. The lateral extension is formed with an opening 76 in which the thermostat 41 is mounted in the same manner as illustrated in FIG. 2.

With the illustrated structure, a tubular extension can be provided of substantially any desired length by using one member 16 either alone or with one or more tubular members 17. The tubular extension can also be used without modification with a high-limit thermostat alone, an anticipator heater alone, or with a high-limit thermostat and an anticipator heater. The heater structure is the same whether it is used with or without a high-limit thermostat. Because individual elements may be used in different combinations without material modifications, the thermostat incorporating this invention can be assembled in a variety of different models without requiring excessive inventory of different types of parts and without requiring a multiplicity of tooling.

Although preferred embodiments of this invention are illustrated, it is to be understood that various modifications and re-arrangements may be resorted to without departing from the scope of the invention disclosed.

What is claimed is:

1. A thermostat comprising a body assembly, a switch in said body assembly including a movable contact, a disc support assembly including elongated support tube means mounted at one end on said body assembly, said support tube means providing a radially extending end wall formed with a central guide opening at its other end, a disc cap telescoping over said other end of said support tube means providing an inwardly extending radial wall spaced from the end wall of said support tube means on the side thereof remote from said body assembly, an imperforate bimetallic disc in said cap between said other end of said tube means and said radial wall, and elongated switch operating means extending through said support tube means and between said disc and said movable contact, said switch operating means operating said switch in response to movement of said disc, said operating means being laterally supported adjacent to said disc by said guide opening.

2. A thermostat as set forth in claim 1 wherein said tube means is substantially cylindrical intermediate its ends and said body assembly provides guide means separate from said movable contact laterally supporting the end of said operating means adjacent to said movable contact.

3. A thermostat as set forth in claim 2 wherein said tube means is provided with a radially extending flange at said one end, said flange being secured to said body assembly.

4. A thermostat as set forth in claim 3 wherein said tube means includes at least two tube members, both of said members including an end wall providing a guide opening through which said operating means extends for lateral support, one of said tube members being mounted on said body assembly at one end and telescoping with the other tube member at its other end.

5. A thermostat as set forth in claim 4 wherein said tube members are similar in shape and size at their ends adjacent to said end walls, each tube member being provided with an enlarged cylindrical portion adjacent to its end remote from said end wall, the end wall end of said one tube member telescoping into the enlarged cylindrical portion of said other member to connect said members.

6. A thermostat as set forth in claim 5 wherein said members are identical in size and shape excepting that said one member is formed with said radially extending flange.

7. A thermostat as set forth in claim 1 wherein a heater assembly is secured to said support assembly adjacent to said disc.

8. A thermostat comprising a body assembly, a switch in said body assembly including a movable contact, a disc support assembly including elongated support tube means mounted at one end on said body assembly, said support tube means providing a central guide opening at its other end, a disc cap mounted on said other end of said support tube means providing an inwardly extending radial wall spaced from the end of said support tube means, a bimetallic disc in said cap between said other end of said tube means and said radial wall, and elongated switch operating means extending through said support tube means and between said disc and said movable contact, said switch operating means operating said switch in response to movement of said disc, said operating means being laterally supported adjacent to said disc by said guide opening, a heater assembly secured to said support assembly adjacent to said disc, said heater assembly includes a heater housing formed with a recess, said cap being positioned in said recess, and retainer means securing said heater housing to said support assembly.

9. A thermostat as set forth in claim 8 wherein said cap is cup-shaped having a cylinder wall extending along the adjacent end of said tube means to an open end, and said retainer means engages the edge of said cap at said open end.

10. A thermostat as set forth in claim 9 wherein said retainer means is a plate formed with an opening through which said tube means extends, said opening being sized so that it engages the edge of said open end of said cap, said plate providing tabs engaging said heater housing to secure said plate and housing on said cap.

11. A thermostat as set forth in claim 10 wherein said plate is formed with a lateral extension, and a second thermostat is mounted on said extension.

12. A thermostat as set forth in claim 11 wherein said plate extension is formed with an opening in which said second thermostat is mounted.

13. A thermostat as set forth in claim 12 wherein said second thermostat is provided with a bi-metallic snap disc and a disc retaining cap, said disc retaining cap extending through said opening in said plate extension and being provided with radially extending surfaces on both sides of said plate which secure said second thermostat in said opening in said plate extension.

14. A thermostat as set forth in claim 8 wherein a pair of grommets are mounted in said heater housing, a lead wire extends into each grommet and is connected to a heater wire from said heater, each grommet being crimped to mechanically grip the associated heater wire and lead wire.

15. A thermostat comprising a body assembly, a switch in said body assembly including a movable contact, a disc support assembly including elongated support tube means mounted at one end on said body assembly, said support tube means providing a central guide opening at its other end, a disc cap mounted on said other end of said support tube means providing an inwardly extending radial wall spaced from the end of said support tube means, a bimetallic disc in said cap between said other end of said tube means and said radial wall, and elongated switch operating means extending through said support tube means and between said disc and said movable contact, said switch operating means operating said switch in response to movement of said disc, said operating means being laterally supported adjacent to said disc by said guide opening, a plate having a lateral extension secured to said tube means substantially adjacent to said other end thereof, and a second thermostat mounted on said lateral extension.

16. A thermostat as set forth in claim 15 wherein said plate extension is formed with an opening in which said second thermostat is mounted.

17. A thermostat as set forth in claim 16 wherein said second thermostat is provided with a bi-metallic snap disc and a disc retaining cap, said disc retaining cap extending through said opening in said plate extension and being provided with radially extending surfaces on both sides of said plate which secure said second thermostat in said opening in said plate extension.

18. A thermostat as set forth in claim 17 wherein said plate is provided with a second opening through which said tube means extend with an interference fit.

References Cited

UNITED STATES PATENTS

| | | | |
|---|---|---|---|
| 3,023,350 | 2/1962 | Broadley et al. | 337—102X |
| 3,014,105 | 12/1961 | Schmitt | 337—343 |
| 2,879,357 | 3/1959 | Them | 337—343 |
| 2,752,454 | 6/1956 | Kurtz | 337—354 |
| 2,196,671 | 4/1940 | Gille et al. | 337—354X |
| 1,540,431 | 6/1925 | Siperek | 337—315 |

BERNARD A. GILHEANY, Primary Examiner

D. M. MORGAN, Assistant Examiner

U.S. Cl. X.R.

337—102, 380